(12) United States Patent
Haramein

(10) Patent No.: US 8,130,893 B2
(45) Date of Patent: Mar. 6, 2012

(54) DEVICE AND METHOD FOR STIMULATION OF MAGNETOHYDRODYNAMICS

(76) Inventor: Nassim Haramein, Holualoa, HI (US)

( * ) Notice: Subject to any disclaimer, the term of this patent is extended or adjusted under 35 U.S.C. 154(b) by 0 days.

(21) Appl. No.: 12/837,295

(22) Filed: Jul. 15, 2010

(65) Prior Publication Data
US 2010/0328000 A1 Dec. 30, 2010

Related U.S. Application Data

(62) Division of application No. 11/976,364, filed on Oct. 24, 2007, now Pat. No. 8,073,094.

(51) Int. Cl.
H05H 1/22 (2006.01)
H05H 1/02 (2006.01)
H05H 1/12 (2006.01)

(52) U.S. Cl. ........ 376/133; 376/103; 376/105; 376/107; 376/127; 376/129; 376/134; 376/135; 376/136; 315/111.51; 315/111.61; 315/111.41

(58) Field of Classification Search ............ 156/345.48, 156/345.49; 315/111.21, 111.41, 111.61, 315/111.81, 111.71, 111.91; 376/103–107, 376/127–130, 133–136
See application file for complete search history.

(56) References Cited

U.S. PATENT DOCUMENTS

| | | | | |
|---|---|---|---|---|
| 4,011,478 A * | 3/1977 | Reenstra | ........................ | 310/155 |
| 4,236,964 A | 12/1980 | Bass et al. | | |
| 4,654,561 A * | 3/1987 | Shelton | .................... | 315/111.71 |
| 6,027,603 A | 2/2000 | Holland et al. | | |
| 6,237,526 B1 * | 5/2001 | Brcka | ........................ | 118/723 I |
| 6,484,492 B2 | 11/2002 | Meholic | | |
| 6,578,889 B2 | 6/2003 | Pearl | | |
| 6,815,899 B2 * | 11/2004 | Choi | ........................ | 315/111.21 |
| 7,079,001 B2 | 7/2006 | Nordberg | | |
| 7,079,085 B2 * | 7/2006 | Lee et al. | ....................... | 343/867 |
| 7,139,349 B2 * | 11/2006 | Leung | ........................... | 376/108 |
| 2001/0022158 A1 * | 9/2001 | Brcka | ........................ | 118/723 I |
| 2003/0057845 A1 * | 3/2003 | Edamura et al. | .......... | 315/111.21 |
| 2003/0062840 A1 * | 4/2003 | Moroz | ..................... | 315/111.51 |
| 2004/0164682 A1 * | 8/2004 | Hopwood et al. | ........ | 315/111.21 |
| 2005/0157832 A1 * | 7/2005 | Nordberg | ...................... | 376/133 |
| 2006/0060464 A1 | 3/2006 | Chang | | |

FOREIGN PATENT DOCUMENTS

JP 63178432 * 7/1988

* cited by examiner

Primary Examiner — Quyen Leung
Assistant Examiner — Terrence Kenerly
(74) Attorney, Agent, or Firm — Fish & Associates, PC

(57) ABSTRACT

A magnetohydrodynamic simulator that includes a plasma container. The magnetohydrodynamic simulator also includes an first ionizable gas substantially contained within the plasma container. In addition, the magnetohydrodynamic simulator also includes a first loop positioned adjacent to the plasma container, wherein the first loop includes a gap, a first electrical connection on a first side of the gap, a second electrical connection of a second side of the gap, and a first material having at least one of low magnetic susceptibility and high conductivity. The first loop can be made up from an assembly of one or a plethora or wire loop coils. In such cases, electrical connection is made through the ends of the coil wires. The magnetohydrodynamic simulator further includes an electrically conductive first coil wound about the plasma container and through the first loop.

20 Claims, 4 Drawing Sheets

DEVICE AND METHOD FOR STIMULATION OF MAGNETOHYDRODYNAMICS

This application is a divisional application of previously filed application number U.S. Ser. No. 11/976,364 filed on Oct. 24, 2007 now U.S. Pat. No. 8,073,094.

FIELD OF THE INVENTION

The present invention relates generally to devices and methods useful in replicating the magnetohydrodynamics occurring in a variety of astrophysical objects. More particularly, the present invention relates to devices and methods useful in performing such replication in a low-energy, controlled laboratory environment.

BACKGROUND OF THE INVENTION

Approximately ninety-six percent of the observable universe is made up of matter that is in a plasma state. As such, in an effort to better understand the universe, the scientific community has dedicated a significant amount of time, energy, and resources to the generation and study of plasmas. The results of some of these efforts are discussed below.

Scientific studies have indicated that plasmas of widely different geometric scales experience similar phenomena. For example, similar types of plasma phenomena are observed in galactic clusters, galactic formations, galactic halos, black hole ergospheres, other stellar objects, and planetary atmospheres. In order to take advantage of this apparent geometric-scale-independence of plasmas, scientific devices have been manufactured that attempt to replicate the motion of the ions in large-scale plasmas (e.g., plasmas of galactic formations) on geometric scales that are containable in an earthly laboratory setting.

To date, these devices have utilized liquids (i.e., liquid sodium) or charged liquids (i.e., charged liquid sodium) to model large astrophysical plasmas. These devices have also relied upon the use of strong magnetic fields to guide ions in the liquids or charged liquids along paths that ions in a plasma would follow.

The above notwithstanding, by definition, actual plasmas are gaseous. In other words, actual plasmas do not contain matter in a liquid or charged liquid state and using ions in liquids or charged liquids to replicate the behavior of ions in a plasma may have shortcomings. Accordingly, it would be desirable to provide novel devices capable of simulating the magnetohydrodynamics of large-scale plasmas in a non-liquid medium.

SUMMARY OF THE INVENTION

The foregoing needs are met, to a great extent, by certain embodiments of the present invention. For example, according to one embodiment of the present invention, a magnetohydrodynamic simulator is provided. The magnetohydrodynamic simulator includes a plasma container. The magnetohydrodynamic simulator also includes an first ionizable gas substantially contained within the plasma container. In addition, the magnetohydrodynamic simulator also includes a first loop positioned adjacent to the plasma container, wherein the first loop includes a gap, a first electrical connection on a first side of the gap, a second electrical connection of a second side of the gap, and a first material having at least one of low magnetic susceptibility and high conductivity. The magnetohydrodynamic simulator further includes an electrically conductive first coil wound about the plasma container and through the first loop.

There has thus been outlined, rather broadly, an embodiment of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
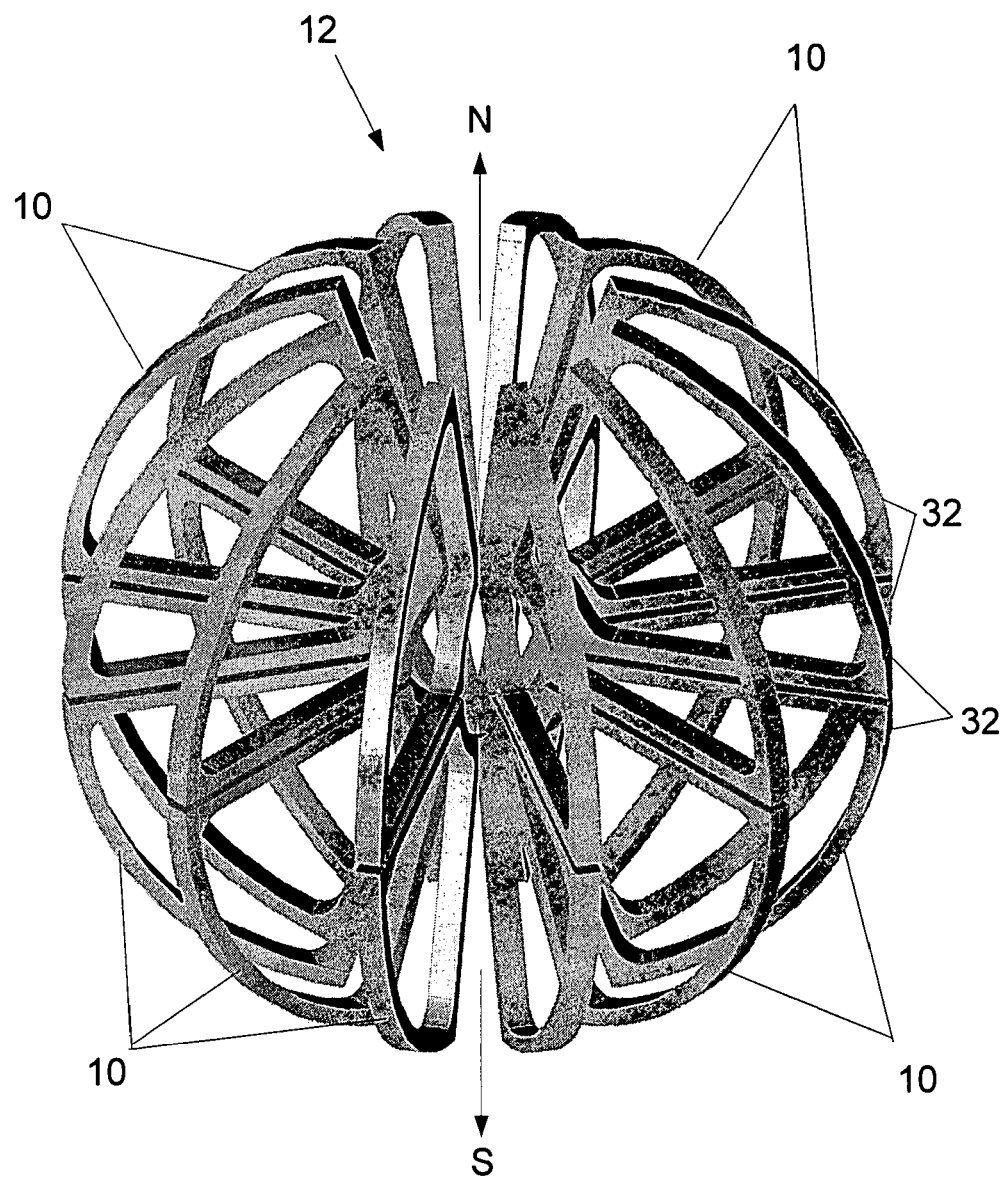
FIG. 1 illustrates a perspective view of a plurality of ribs included in a magnetohydrodynamic (MHD) simulator according to an embodiment of the present invention.
Figure 2:
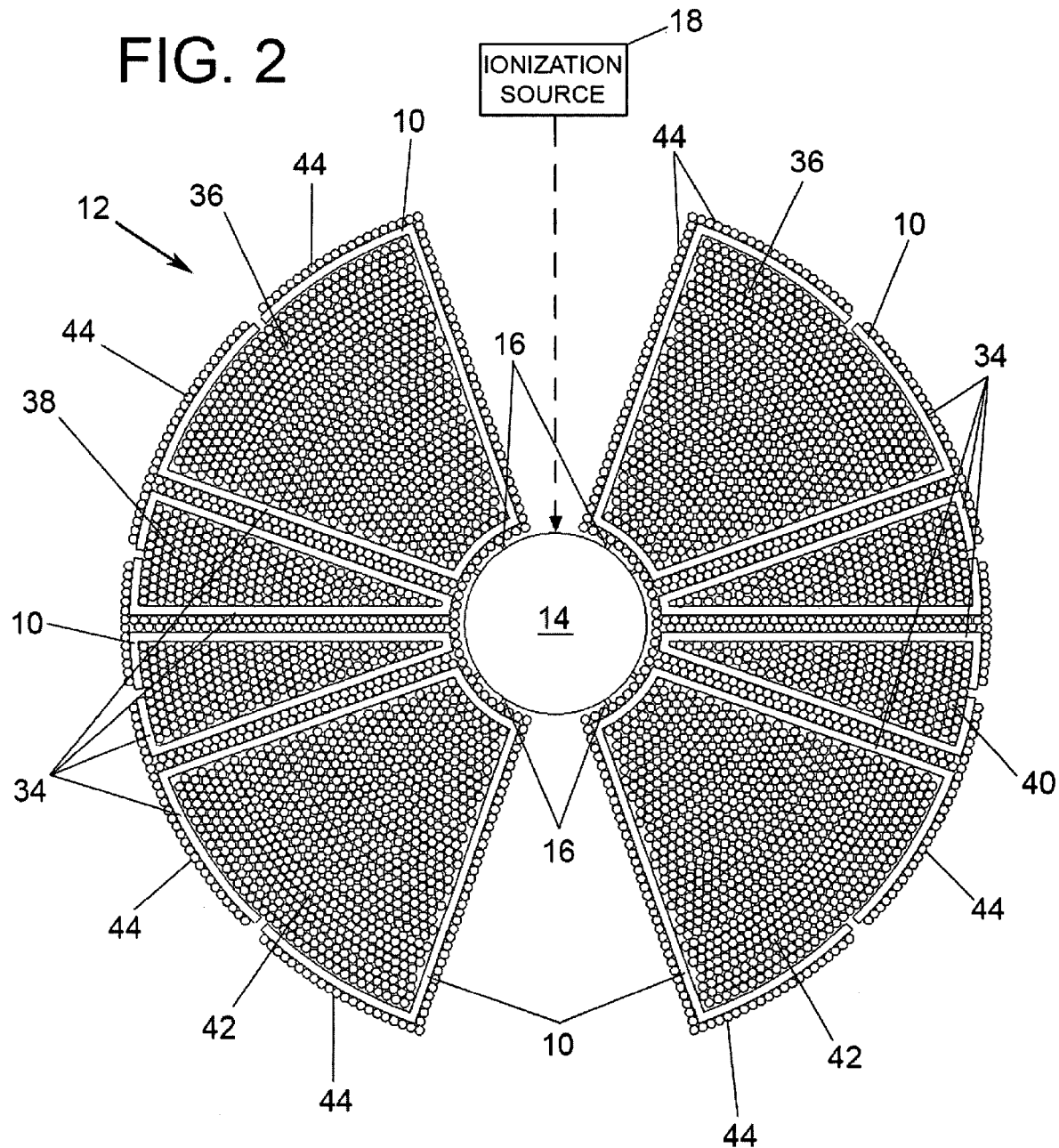
FIG. 2 illustrates a cross-sectional view of ribs and other components included in an MHD simulator according to another embodiment of the present invention.
Figure 3:
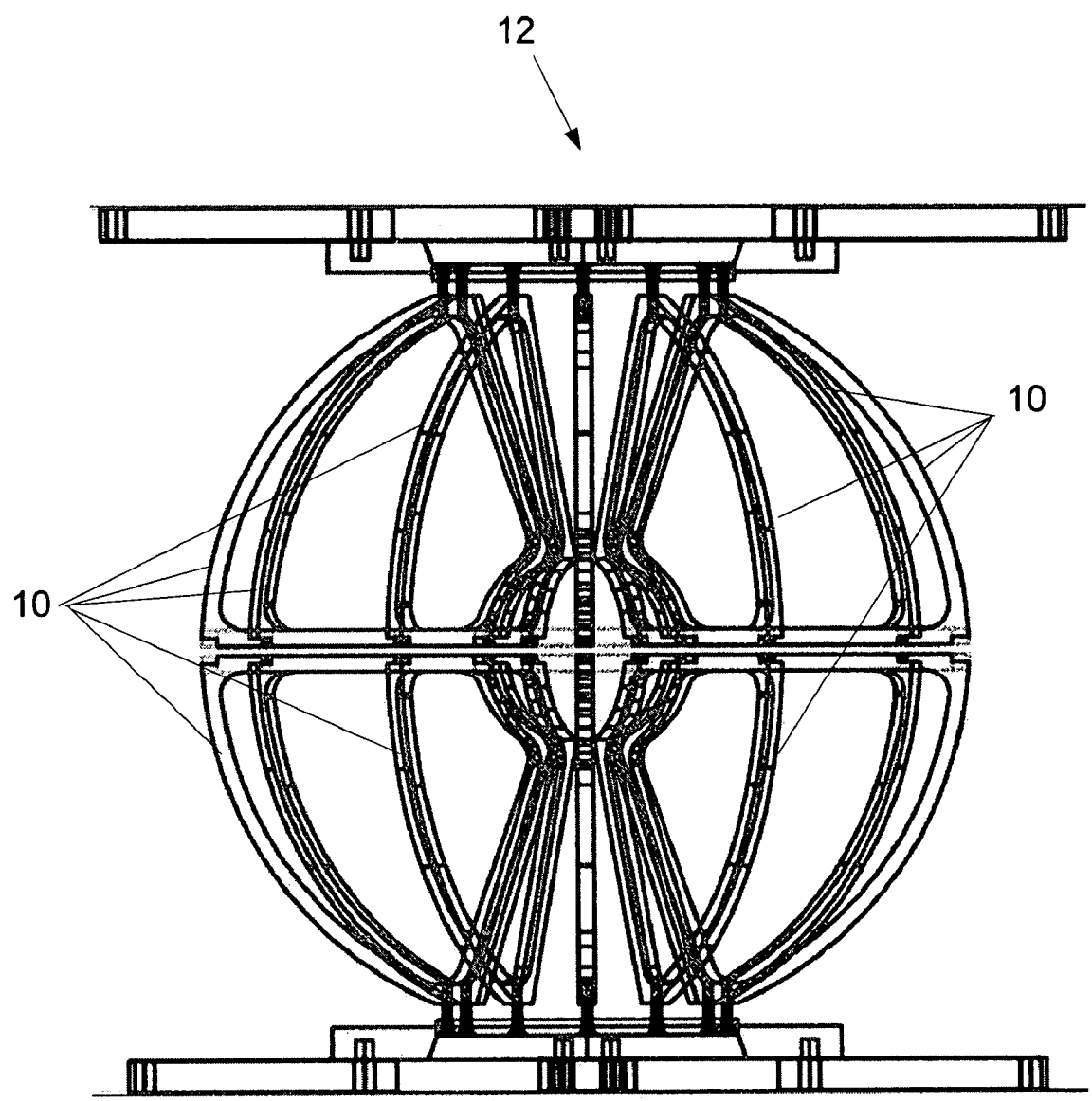
FIG. 3 illustrates a side view of the ribs illustrated in FIG. 1, along with other components included in the MHD simulator that includes these ribs.

The invention will now be described with reference to the drawing figures, in which like reference numerals refer to like parts throughout. FIG. 1 illustrates a perspective view of a plurality of ribs 10 included in a magnetohydrodynamic (MHD) simulator 12 according to an embodiment of the present invention. FIG. 2 illustrates a cross-sectional view of ribs 10 and other components included in an MHD simulator 12 according to another embodiment of the present invention. FIG. 3 illustrates a side view of the ribs 10 illustrated in FIG. 1, along with other components included in the MHD simulator 12 that includes the ribs 10.

As illustrated in FIGS. 1-3, the MHD simulator 12 includes a plasma container 14 positioned substantially at the center thereof. The plasma container 14 may be of any geometry. However, a substantially spherical plasma container 14 is illustrated in FIGS. 1-3. Also, although the plasma container 14 may be supported within the MHD simulator 12 in any manner that will become apparent to one of skill in the art upon practicing one or more embodiments of the present invention, the plasma container 14 illustrated in FIGS. 1-3 is connected to some of the ribs 10 via a plurality of supports 16.

The plasma container 14 illustrated in FIGS. 1-3 has a hollow interior and a solid exterior made of drawn crystal. However, other materials may also be used to form the exterior according to certain embodiments of the present invention.

Contained within the plasma container 14 are one or more ionizable gases. For example, argon, nitrogen, helium, xenon, neon, carbon dioxide, carbon monoxide, and/or krypton may be contained within the plasma container 14, as may a variety of other gases. Typically, before one or more gases are added to the plasma container 14, the interior of the plasma container 14 is evacuated to a vacuum.

As illustrated in FIG. 2, the MHD device 12 includes an ionization source 18 that is focused on the plasma container 14. More specifically, the ionization source 18 is focused on a substantially central portion of the plasma container 14. According to certain embodiments of the present invention, the ionization source 18 is situated such that an energy beam emitted therefrom (e.g., a laser beam illustrated as the dashed line in FIG. 2) strikes the plasma container 14 without contacting any of the ribs 10 included in the MHD simulator 12.

Although the ionization source 18 illustrated in FIG. 2 is a laser, other sources of ionization energy may be used to ionize the one or more gases in the plasma container 14. For example, a radio frequency (RF) ionization source may be used. Also, according to certain embodiments of the present invention, one or more lasers may be used, as may one or more mirrors to direct the laser beam(s) to the plasma container 14, typically through one of the poles (N, S) of the MHD simulator 12 illustrated in FIG. 1. Lasers that may be used include phase conjugate laser, continuous lasers, and pulsed lasers.

Figure 4:
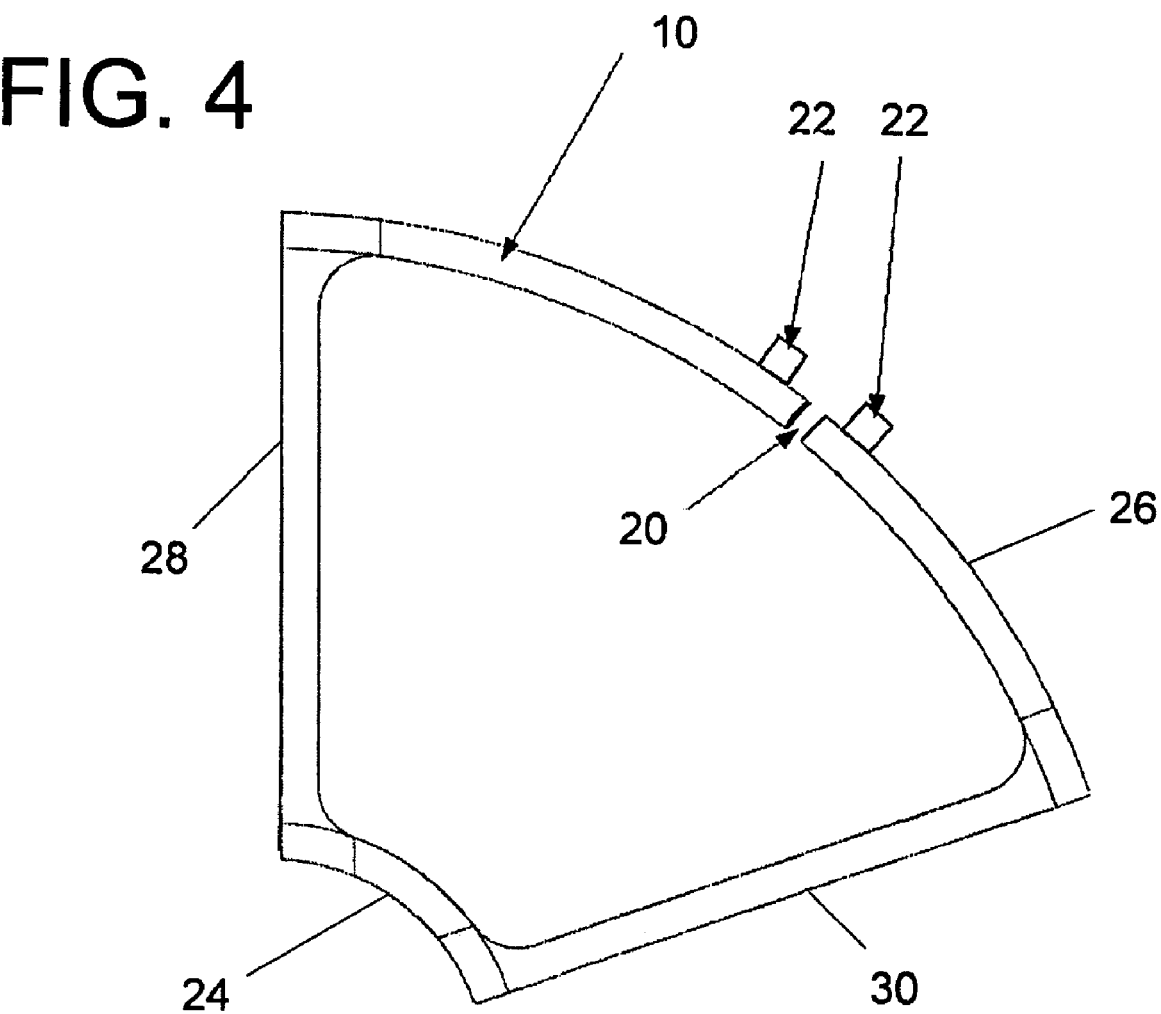
FIG. 4 illustrates a side view of a rib according to certain embodiments of the present invention.

FIG. 4 illustrates a side view of a rib 10 according to certain embodiments of the present invention. As illustrated in FIG. 4, the rib 10 is a loop that, as illustrated in FIG. 2, is positioned adjacent to the plasma container 14. However, rather than being closed, the loop includes a gap 20. On either side of the gap 20 are electrical connections 22 (i.e., electrical contact points) to which electrical wires (not illustrated) may be connected.

According to certain embodiments of the present invention, the ribs 10 are constructed to include loops of conductive material wrapped around a solid rib 10. In addition, according to certain embodiments of the present invention, the ribs 10 are formed from loops of conductive material to form coil structures with a plurality of layers. Some of these layers, according to certain embodiments of the present invention, are used to monitor the coil's field interactions by inductive processes.

Also, according to certain embodiments of the present invention, another independent winding is added to the coil inside the ribs 10. According to such embodiments, the coil is typically toroidal and the independent winding is used for monitor purposes through induction processes. For example, using such induction processes, pulse rate, amperage, voltage levels, etc. may be monitored.

Typically, the above-discussed ribs 10 are made from materials having low magnetic susceptibility and/or high conductivity. For example, according to certain embodiments of the present invention, the ribs 10 include aluminum. Also, the cross-section of the rib 10 illustrated in FIG. 4, according to certain embodiments of the present invention, is substantially square. However, other geometries are also within the scope of the present invention.

As illustrated in FIG. 4, the rib 10 includes a proximate arcuate portion 24 and a distal arcuate portion 26 (relative to the plasma container 14 when the MHD simulator 12 is in operation). The rib 10 illustrated in FIG. 4 also includes a pair of substantially linear portions 28, 30, each connected to both the proximate arcuate portion 24 and the distal arcuate portions 26.

As illustrated in FIG. 4, the proximate arcuate portion 24 and the distal arcuate portion 26 lie substantially along portions of the circumferences of two substantially concentric circles of different sizes (not illustrated). According to certain embodiments of the present invention, the proximate arcuate portion 24 and the distal arcuate portion 26 each extend across approximately 70.52 angular degrees. However, according to other embodiments of the present invention, the arcuate portions 24, 26 may extend across additional or fewer angular degrees. For example, as illustrated in FIG. 2, the ribs 10 illustrated at the top and bottom of the MHD simulator 12 extend across approximately 51.26 angular degrees while the ribs 10 illustrated in the middle of the MHD simulator 12 extend across approximately 19.47 angular degrees.

As illustrated in FIG. 1, there are twelve duos 32 of ribs 10 that are substantially atop each other. Each rib 10 included in each duo 32 is substantially coplanar with the other rib 10 in the duo 32. As also illustrated in FIG. 1, if a plasma container 14 were included in the portion of the MHD simulator 12 illustrated therein, each duo 32 of ribs 10 would be positioned adjacent to the plasma container 14. Also, the twelve duos 32 would be positioned at substantially equal intervals about the plasma container 14. It should be noted that, according to alternate embodiments of the present invention, more or less than twelve duos 32 are included. These duos 32 are typically also placed at substantially equal intervals about the plasma container 14.

FIG. 2 illustrates two quartets 34 of ribs 10. Like the ribs 10 in the duos 32 discussed above, each rib 10 in each quartet 34 is substantially coplanar with the other ribs 10 in the quartet 34. According to certain embodiments of the present invention, twelve quartets 34 are positioned about a plasma container 14 at substantially equal intervals. However, the inclusion of additional or fewer than twelve quartets 34 is also within the scope of certain embodiments of the present invention.

In addition to the components discussed above, the MHD simulator 12 illustrated in FIG. 2 includes a top interior coil 36, an upper middle interior coil 38, a lower middle interior coil 40, and a bottom interior coil 42. Each of these coils 36, 38, 40, 42 is wound about the plasma container 14 and traverses through at least one of the ribs 10.

Also illustrated in FIG. 2 is an exterior coil 44 that is wound about the plasma container 14 and that does not traverse through any of the ribs 10. Rather the exterior coil 44 also winds about the ribs 10. According to certain embodiments of the present invention, instead of a single exterior coil 44 being utilized, each of the inner coils 36, 38, 40, 42 has an associated exterior coil (not illustrated) that is wound about the set of ribs through which the inner coil in question 36, 38, 40, 42 traverses.

Each of these coils 36, 38, 40, 42, 44 typically includes one or more conductive materials. For example, copper is used according to certain embodiments of the present invention.

As discussed above, each rib 10 includes a pair of electrical connections 22. These electrical connections 22 may be connected to one or more wires and/or electrical devices. Also, it should be noted that each of the above-discussed coils 36, 38, 40, 42, 44 may be connected to one or more wires, electrical circuits, and/or electronic devices.

Certain circuits and/or devices according to embodiments of the present invention are used to switch various current and/or voltage levels to individual or pluralities of ribs 10, inner coils 36, 38, 40, 42, and/or outer coils 44 discussed above. This switching, according to certain embodiments of the present invention, produces one or more electromagnetic fields, some of which may be orthogonal to other fields and/or which may be rotating.

In effect, in the embodiments of the present invention discussed above, each rib 10 may effectively become a one-loop or a multiple-loop electromagnet that is pulsed in sequence to produce a rotating magnetic field that would be vertically oriented in the embodiment of the present invention illustrated in FIG. 1. Also, the inner and/or outer coils 36, 38, 40, 42, 44, either individually, in pairs, etc., may be used to create one or more substantially horizontal magnetic fields in FIG. 1.

In order to generate the above-mentioned fields, the ribs 10 and coils 36, 38, 40, 42, 44, may be operably connected to, for example, off-the-shelf current-limited power supplies. Depending on the embodiment of the present invention, single or multiple ribs 10 may be powered with either a single or multiple power supplies.

Computers and electronic switches are also used according to certain embodiments of the present invention to control various combinations of power supply, coil, and/or rib 10 connections. For example, a rapid MOSFET switching circuit may be used to control the flow of current to one or more of the above-discussed coils 36, 38, 40, 42, 44. Also, a digital interface to a control computer may be provided to give a scientist a graphical interface to simplify operation of the MHD simulator 12.

In addition to the above-listed components, sensors and/or other devices may be included in the MHD simulator 12 in order to quantify what is happening in the plasma container 14 and to monitor and control the MHD simulator 12 itself. For example, Langmuir probes may be included to measure electron temperature, electron density, and/or plasma potential. Also, electrometers may be included to measure electrostatic fields, current and/or voltage may be monitored and/or recorded through outputs on the power supplies, and Hall Effect sensors and/or the above-mentioned monitoring coils may be used to measure magnetic fields. In addition, temperatures within the MHD simulator 12 may be measured using thermocouple probes and/or "Heat Spy" devices. Also, UV, IR, and visible light bands may be recorded using appropriate CCD cameras and/or photomultiplier tubes. Such UV, visible, and/or IR imaging sensors may be configured with telescopes, endoscopes and/or fiber-optic bundle systems to relay the images to cameras or other detectors. In addition, two or more rod lens endoscopes may be arranged so that images can be taken as stereo pairs, thus allowing for detailed photogrammetry of plasma shapes and the like within the plasma container 14. Typically, the telescope would be arranged so that its optical path is at right angles to the laser optical path. When observations are needed, a scientist may move a right prism on a swing arm into the laser optical path.

Other sensors may also be included to conduct certain experiments. These sensors may be sensors capable of sensing X-ray flux, gamma ray flux, neutron flux, proton flux, alpha particle flux (e.g., using Geiger counters), a scintillation counter, and/or various other particle counters.

According to certain embodiments of the present invention, providing current to the ribs 10 and/or the inner and outer coils 36, 38, 40, 42, 44, in a properly timed sequence and in specific directions generates rotating double-toroidal flow patterns in the highly ionized plasma contained in the plasma container 14.

More specifically, in operation, one or more ionizable gases are placed in the plasma container 14. The plasma container 14 is then placed in the center cavity of the substantially spherical structure formed by the ribs 10 and inner and outer coils 36, 38, 40, 42, 44, discussed above. The ionization source 18 is then energized and used to ionize the gases in the plasma container 14. Pulsing of the inner and outer coils is then initiated at the same time as the rib pulsing.

One representative reason for generating the above-mentioned rotating double-toroidal flow patterns in the highly ionized plasma contained in the plasma container 14 is the result of evidence that this pattern is found in the universe at multiple scales. For example, there is evidence that the circulation of matter around galaxies, including black holes' ergospheres, is closely modeled to such a double torus pattern, which is predicted by the Haramein-Rauscher solution to Einstein's field equation. Furthermore, examples of that pattern are found in quasars, pulsars and the Coriolis forces of the plasma dynamics surrounding our sun and planets such as Saturn and Jupiter. Devices according to certain embodiments of the present invention, allow for such patterns to be generated in a low-energy lab environment.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A magnetohydrodynamic simulator, comprising:
a permanently sealed plasma container containing an ionizable gas and having a axial pole;
a first independently controlled conductive coil wound around the plasma container orthogonal to the axial pole and configured to generate a first electromagnetic field through the container and along the axial pole;
at least one independently controlled conductive rib loop substantially orthogonal to the first conductive coil and parallel to the axial pole, and configured to generate a second electromagnetic field within the plasma container that is substantially orthogonal to the first electromagnetic field and where the first and the second electromagnetic fields cooperate in generating a controllable contained rotating patterned plasma flow of the ionizable gas around the axial pole within the plasma container.

2. The simulator of claim 1, wherein the first conductive coil traverses through the at least one conductive rib loop.

3. The simulator of claim 1, wherein the first conductive coil is wound exterior to the at least one conductive rib loop.

4. The simulator of claim 1, further comprising a plurality of conductive rib loops disposed around the plasma container and orthogonal to the first conductive coil.

5. The simulator of claim 4, wherein the conductive rib loops each comprise a portion positioned adjacent to the plasma container.

6. The simulator of claim 5, wherein the portion comprises an acute arcuate portion.

7. The simulator of claim 4, wherein the plurality of conductive rib loops comprises a plurality of duos, the duos each including two substantially coplanar rib loops.

8. The simulator of claim 4, wherein the plurality of conductive rib loops comprises a plurality of quartets, the quartets each including four substantially coplanar of rib loops.

9. The simulator of claim 8, further comprising at least two quartets positioned about the plasma container at substantially equal intervals.

10. The simulator of claim 1, further comprising a circuit coupled to the at least one conductive loop via an electrical connection and configured to provide current pulses to the at least one conductive loop, causing generation of the second electromagnetic field.

11. The simulator of claim 10, wherein the circuit is configured to pulse a plurality of conductive rib loops in sequence, causing generation of the second electromagnetic field and the flow.

12. The simulator of claim 1, wherein the flow comprises at least one rotating torodial flow within the plasma container.

13. The simulator of claim 1, further comprising at least one additional conductive coil wound around the container and configured to generate a third magnetic field that cooperates with the first magnetic filed in generating the flow of the ionizable gas.

14. The simulator of claim 13, wherein the flow comprise a double torodial flow.

15. The simulator of claim 1, wherein the plasma container comprises a substantially spherical geometry.

16. The simulator of claim 15, wherein the plasma container comprises a drawn crystal sphere having a solid exterior.

17. The simulator of claim 1, wherein the at least one conductive rib loop comprises a monitoring coil layer configured to monitor field interactions of the at least one conductive rib loop.

18. The simulator of claim 1, wherein the first conductive coil comprises a monitoring toroidal coil configured to monitor field interactions of the first conductive coil.

19. The simulator of claim 1, further comprising an ionizing source directed along the axial pole of the plasma container.

20. The simulator of claim 1, further comprising a plurality of sensors configured to capture data associated with the ionizable gas while under flow.

* * * * *